US011762704B2

(12) United States Patent
Kuriu

(10) Patent No.: US 11,762,704 B2
(45) Date of Patent: Sep. 19, 2023

(54) RESOURCE ALLOCATION DEVICE, RESOURCE MANAGEMENT SYSTEM, AND RESOURCE ALLOCATION PROGRAM

(71) Applicant: Nippon Telegraph and Telephone Corporation, Tokyo (JP)

(72) Inventor: Keiko Kuriu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 342 days.

(21) Appl. No.: 17/261,748

(22) PCT Filed: Jul. 4, 2019

(86) PCT No.: PCT/JP2019/026624
§ 371 (c)(1),
(2) Date: Jan. 20, 2021

(87) PCT Pub. No.: WO2020/022018
PCT Pub. Date: Jan. 30, 2020

(65) Prior Publication Data
US 2021/0334145 A1    Oct. 28, 2021

(30) Foreign Application Priority Data
Jul. 23, 2018    (JP) .................... 2018-137323

(51) Int. Cl.
*G06F 9/50* (2006.01)
*G06F 9/455* (2018.01)

(52) U.S. Cl.
CPC ........ *G06F 9/5044* (2013.01); *G06F 9/45558* (2013.01); *G06F 9/5077* (2013.01); *G06F 2009/45562* (2013.01)

(58) Field of Classification Search
CPC .. G06F 9/5044; G06F 9/45558; G06F 9/5077; G06F 2009/45562; G06F 2209/503
See application file for complete search history.

(56) References Cited

U.S. PATENT DOCUMENTS

| 2009/0210527 | A1  | 8/2009 | Kawato |
| 2013/0227144 | A1  | 8/2013 | Saito et al. |
| 2016/0162320 | A1* | 6/2016 | Singh .................. G06F 9/45533 718/1 |

FOREIGN PATENT DOCUMENTS

| JP | 2011-28705 | 2/2011 |
| WO | WO 2007/136021 | 11/2007 |
| WO | WO 2012/039053 | 3/2012 |

OTHER PUBLICATIONS

Docs.openstack.org, [online], "CPU Topologies," May 20, 2018, retrieved on Jul. 9, 2018, retrieved from URL<https://docs.openstack.org/nova/pike/admin/cpu-topologies.html>, 5 pages.
(Continued)

*Primary Examiner* — Sisley N Kim
(74) *Attorney, Agent, or Firm* — Fish & Richardson P.C.

(57) ABSTRACT

[Problem] To achieve resource allocation suitable for both a resource providing side and a using side.
[Solution] A resource allocation apparatus 1 includes a filtering unit 12 configured to receive an allocation request specifying an amount of use of a physical CPU to be used by a virtual CPU and a characteristic of the physical CPU for each virtual CPU and select resources for allocation 2 that match the characteristic of the physical CPU specified in the allocation request, a weighting unit 13 configured to choose a physical CPU that is to serve as an allocation destination of a virtual CPU based on an amount of use in which each of the selected resources for allocation 2 is available and an amount of use of the physical CPU specified in the allocation request, and a virtual machine generation unit 14 configured to allocate the virtual CPU specified in the allocation request to the physical CPU chosen as the allocation destination.

7 Claims, 7 Drawing Sheets

(56) References Cited

OTHER PUBLICATIONS

Docs.openstack.org, [online], "Filter Scheduler," May 21, 2018, retrieved on Jul. 9, 2018, retrieved from URL<https://docs.openstack.org/nova/latest/user/filter-scheduler.html#filtering>, 7 pages.

* cited by examiner

| TYPE OF PROCESSING | CPU USAGE RATE |
|---|---|
| PACKET PROCESSING | 50% |
| CONNECTION PROCESSING | 30% |
| AUTHENTICATION PROCESSING | 45% |
| BATCH PROCESSING | 20% |

31a

| PROCESSING CHARACTERISTICS | CHARACTERISTIC VALUE |
|---|---|
| EQUAL TO OR LESS THAN 10 TIMES | F 1 |
| FROM 11 TIMES TO 100 TIMES | F 2 |
| FROM 101 TIMES TO 1000 TIMES | F 3 |

| VIRTUAL CPU | TYPE OF PROCESSING | USAGE RATE | CHARACTERISTIC VALUE |
|---|---|---|---|
| V 1 | PACKET PROCESSING | 50% | F 1 |
| V 2 | BATCH PROCESSING | 20% | F 2 |

Fig. 4

| PHYSICAL CPU | REMAINING USABILITY RATE | CHARACTERISTIC VALUE |
|---|---|---|
| C 1 | 20% | F 2 |
| C 2 | 100% | F 1 |
| C 3 | 80% | F 2 |
| C 4 | 50% | F 1 |

Fig. 5

| VIRTUAL CPU | ALLOCATION DESTINATION CANDIDATE | ACCEPTED/ REJECTED |
|---|---|---|
| V 1 | C 1 | REJECTED |
| V 1 | C 2 | CANDIDATE |
| V 1 | C 3 | REJECTED |
| V 1 | C 4 | CANDIDATE |
| V 2 | C 1 | CANDIDATE |
| V 2 | C 2 | REJECTED |
| V 2 | C 3 | CANDIDATE |
| V 2 | C 4 | REJECTED |

⇩

| VIRTUAL CPU | ALLOCATION DESTINATION CANDIDATE | RANKING |
|---|---|---|
| V 1 | C 2 | 2 |
| V 1 | C 4 | 1 |
| V 2 | C 1 | 1 |
| V 2 | C 3 | 2 |

Fig. 6

| PHYSICAL CPU | REMAINING USABILITY RATE | CHARACTERISTIC VALUE |
|---|---|---|
| C 1 | 0% | F 2 |
| C 2 | 100% | F 1 |
| C 3 | 80% | F 2 |
| C 4 | 0% | F 1 |

Fig. 7

RESOURCE ALLOCATION DEVICE, RESOURCE MANAGEMENT SYSTEM, AND RESOURCE ALLOCATION PROGRAM

CROSS-REFERENCE TO RELATED APPLICATIONS

This application is a National Stage application under 35 U.S.C. § 371 of International Application No. PCT/JP2019/026624, having an International Filing Date of Jul. 4, 2019, which claims priority to Japanese Application Serial No. 2018-137323, filed on Jul. 23, 2018. The disclosure of the prior application is considered part of the disclosure of this application, and is incorporated in its entirety into this application.

TECHNICAL FIELD

The present invention relates to a resource allocation apparatus, a resource management system, and a resource allocation program.

BACKGROUND ART

As a server infrastructure technology for building and operating computer systems, virtual machines (VMs), which are virtual computers using virtual devices that are realized by virtualizing physical computing resources, have become widespread. A virtual device serving as a constituent component of a VM is, for example, a virtual CPU created by virtualizing a physical CPU.

For a service that provides a VM as infrastructure (Infrastructure as a Service (IaaS)). OpenStack (registered trade mark) described in Non Patent Document 1, for example, provides a scheduling function for regulating which resources (computer resources or network resources) are to be allocated to which VM. In this scheduling function, two-step processing of selecting (filtering) resource candidates that are eligible for allocation of the VM, and prioritization (weighting) for choosing a resource that is eligible for allocation of the VM from the selected resource candidates is performed, and thereby the resource that is an allocation destination of each VM is identified.

Hereinafter, a virtual CPU that is accommodated in a VM is described as an allocation object, and an allocation destination of the virtual CPU is described as a physical CPU. One or more virtual CPUs are accommodated in one VM. One or more virtual CPUs operate in one physical CPU. Note that a scheme in which one physical CPU is occupied (dedicated) by one virtual CPU (dedicated allocation scheme) may be adopted, or a scheme in which one physical CPU is shared by a plurality of virtual CPUs (shared allocation scheme) may be adopted.

An infrastructure operator that provides an IaaS service can set an overcommit ratio representing the number of virtual CPUs to be allocated to one physical CPU in the shared allocation scheme (Non Patent Literature 2). If an overcommit ratio is increased to allocate more virtual CPUs to one physical CPU, the infrastructure operator sees high resource use efficiency and improved profitability.

CITATION LIST

Non Patent Literature

Non Patent Literature 1: OpenStack, "Filter Scheduler", [online], Internet <URL: https://docs.openstack.org/nova/latest/user/filter-scheduler.html#filtering> [retrieved Jul. 9, 2018]

Non Patent Literature 2: OpenStack, "CPU topologies", [online], Internet <URL: https://docs.openstack.org/nova/pike/admin/cpu-toplogies.html> [retrieved Jul. 9, 2018]

SUMMARY OF THE INVENTION

Technical Problem

In common IaaS infrastructure, a service provider that provides VMs requests an amount of necessary resources and an infrastructure operator chooses appropriate resources based on the requested resources using the scheduling function.

Here, the infrastructure operator and the service provider that is provided the infrastructure and provides each of consumers with the service often do not share information of the infrastructure for the IaaS service, and thus, information sharing between such entities is segmented. As a result, both entities have the following problems.

If the service provider requests an excessive amount of resources for content of a service that originally requires a small load, the infrastructure operator lowers the overcommit ratio or adopts the dedicated allocation scheme, which may cause a problem that accommodation efficiency does not rise.

If the overcommit ratio is set to be excessively high to maximize benefits to the infrastructure operator, there is a problem that the service provider sees service quality deteriorating due to a poor amount of resources when executing the content of the service that requires a large load.

Note that appropriate resources that the service provider can request from the infrastructure operator may vary depending on the content of the service of the service provider. As a virtual CPU used in a VM for the network function, for example, a physical CPU capable of executing network processing such as packet transfer processing, connection processing, or the like at a high speed is preferably allocated. On the other hand, if a physical CPU having high-performance screen rendering capability is allocated to a VM for the network function, the screen rendering capability is not used much, and the resources are wasted.

Therefore, the present invention aims to achieve resource allocation suitable for both a resource providing side and a using side.

Means for Solving the Problem

In order to solve the above-described problems, a resource allocation apparatus of the present invention has the following features.

The present invention includes a filtering unit configured to receive an allocation request specifying an amount of use of a physical resource to be used by a virtual resource and a characteristic of the physical resource for each of the virtual resources and select a resource for allocation that matches the characteristic of the physical resource specified in the allocation request, a weighting unit configured to choose the physical resource that is to serve as an allocation destination of the virtual resource based on an amount of use in which each of the selected resources for allocation is available and the amount of use of the physical resource specified in the allocation request, and a resource allocation unit configured to allocate the virtual resource specified in the allocation request to the physical resource chosen as the allocation destination.

Thus, by selecting a resource for allocation that matches the characteristic of the physical resource, a resource appropriate for the resource using side is allocated, and a resource for allocation is selected based on the available amount of use of the resource for allocation, and thus a resource appropriate for the resource providing side is allocated.

In the present invention, the weighting unit preferentially chooses as an allocation destination for the virtual resource as the amount of use in which each of the selected resources for allocation is available becomes smaller.

As a result, the total number of resources for allocation to be provided can be saved, which improves profitability of the provider of the resources for allocation.

The present invention is a resource management system configured to include the resource allocation apparatus, a terminal of an infrastructure operator that operates the resources for allocation, and a terminal of a service provider that receives the resources for allocation and provides a service, in which the terminal of the infrastructure operator notifies the terminal of the service provider of performance data and characteristic data of each of the resources for allocation, and the terminal of the service provider identifies the amount of use of the physical resource to be used by the virtual resource from the notified performance data for each of the resources for allocation and identifies a characteristic of the physical resource to be used by the virtual resource from the notified characteristic data for each of the resources for allocation, and thereby creating the allocation request.

Thus, due to the information shared between the infrastructure operator and the service provider, a physical resource convenient for both entities can be allocated.

In the present invention, the terminal of the infrastructure operator gives a notification of a CPU usage rate when the resource for allocation is a physical CPU for each type of processing to be operated on the physical CPU as performance data for each of resources for allocation, and the terminal of the service provider obtains a CPU usage rate used by the virtual resource as an amount of use of the physical resource based on the notified CPU usage rate for each type of processing from types of processing of a service input in advance.

Thus, the service provider can notify the infrastructure operator of an allocation request for a physical resource suitable for the content of the service to be provided by the service provider.

Effects of the Invention

According to the present invention, resource allocation suitable for both a resource providing side and a using side can be achieved.

BRIEF DESCRIPTION OF DRAWINGS

FIG. 3 is a table showing resource management information according to the present embodiment.

FIG. 4 is a table showing a resource allocation definition file according to the present embodiment.

FIG. 5 shows a first table stored in a resource management unit according to the present embodiment.

FIG. 6 shows a second table and a third table stored in the resource management unit according to the present embodiment.

FIG. 7 shows a fourth table stored in the resource management unit according to the present embodiment.

DESCRIPTION OF EMBODIMENTS

An embodiment of the present invention will be described below in detail with reference to the drawings.

Figure 1:
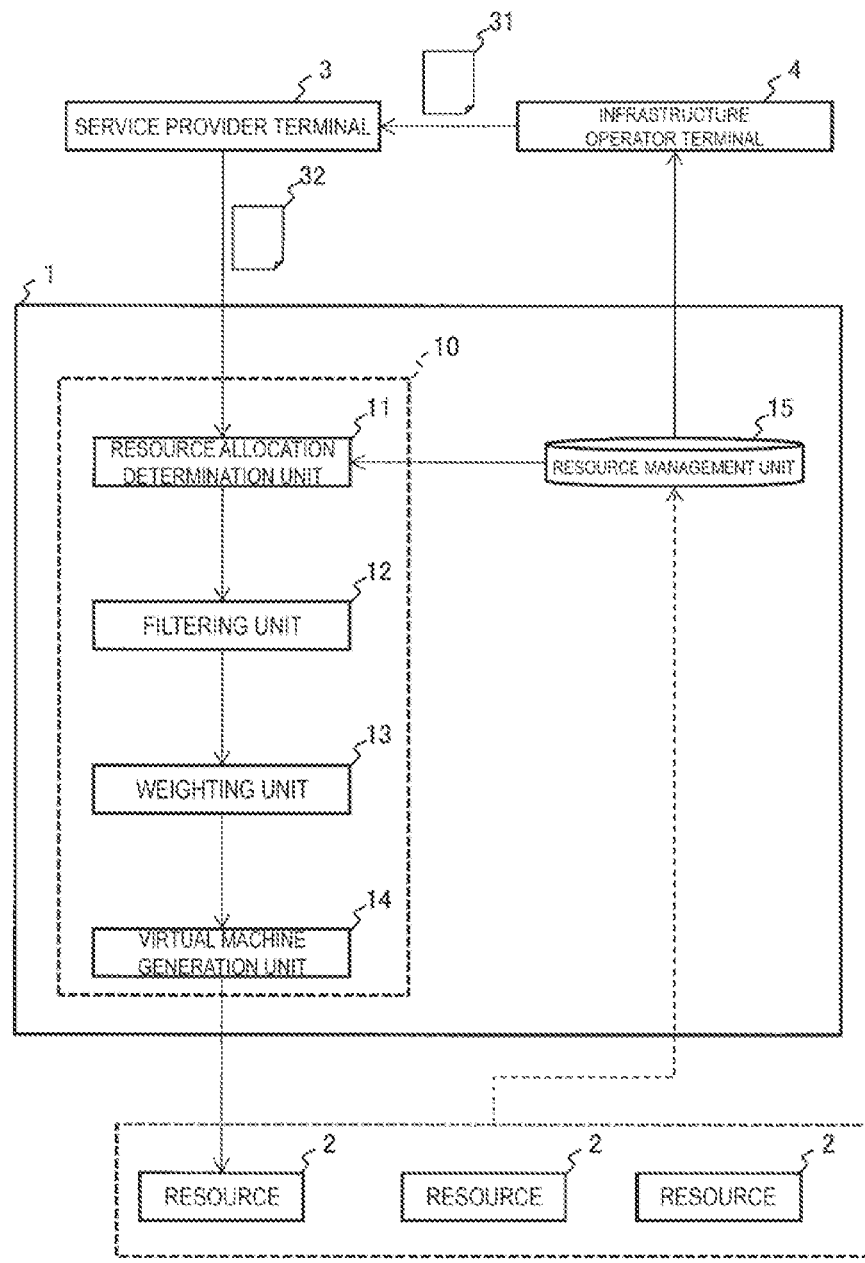
FIG. 1 is a configuration diagram of a resource management system according to the present embodiment.

FIG. 1 is a configuration diagram of a resource management system.

The resource management system is configured of a resource allocation apparatus 1, resources for allocation 2, a service provider terminal (a terminal of a service provider) 3, and an infrastructure operator terminal (a terminal of an infrastructure operator) 4 that are connected by a network. Each of the apparatuses is configured as a computer with a central processing unit (CPU), a memory, a storage means (a storage unit) such as a hard disk, and a network interface. The computer, when the CPU executes a program (also referred to as an application or an app which is an abbreviation for application) read into the memory, causes a control unit (control means) configured by each of processing units to operate.

The infrastructure operator terminal 4 provides the resources for allocation 2 as IaaS to the service provider terminal 3. The resource allocation apparatus 1 manages situations of the resources for allocation 2 and is responsible for allocation processing of the individual resources. In addition, the infrastructure operator terminal 4 provides information regarding the resources for allocation 2 acquired from the resource allocation apparatus 1 as resource management information 31 to the service provider terminal 3 (FIG. 3 for more details).

The service provider terminal 3 provides a service to a customer, who is not illustrated. The service provider inputs in advance individual processing types for building a service to be provided (such as "packet processing", "batch processing", or the like) and frequencies of running the processing types in a VM into the service provider terminal 3. The service provider terminal 3 creates, based on the provided resource management information 31 and the information input in advance, details of resources required to build the service to be provided as a resource allocation definition file 32, and notifies the resource allocation apparatus 1 of the resource allocation definition file 32 to request resource allocation (shown in detail in FIG. 4).

In other words, the infrastructure operator terminal 4 transmits the resource management information 31, and the service provider terminal 3 transmits the resource allocation definition file 32, and thereby the information is exchanged between the two entities beforehand.

The resource allocation apparatus 1 includes, as a processing unit 10, a resource allocation determination unit 11, a filtering unit 12, a weighting unit 13, and a virtual machine generation unit (resource allocation unit) 14. In addition, the resource allocation apparatus 1 has a resource management unit 15 to store data handled by the processing unit 10 (shown in detail in FIGS. 5 to 7).

The resource allocation determination unit 11 controls scheduling such that each of requested virtual CPUs (virtual resources) is allocated to an appropriate physical CPU (physical resource) in consideration of characteristics of the resources for allocation 2 managed by the resource management unit 15 and characteristics of the virtual CPU requested in the resource allocation definition file 32. In other words, the resource allocation determination unit 11 instructs each of the other processing units (the filtering unit 12, the weighting unit 13, and the virtual machine generation unit 14) to perform scheduling in three stages as follows.

As a first stage, the filtering unit 12 selects physical CPUs having characteristics that are the same as the characteristics of a virtual CPU.

As a second stage, the weighting unit 13 chooses a physical CPU among the selected physical CPUs suitable for a usage rate of the virtual CPU as an allocation destination.

As a third stage, the virtual machine generation unit 14 allocates the virtual CPU to the physical CPU serving as an allocation destination, and generates a virtual machine (VM) that is to accommodate the virtual CPU.

The resource management unit 15 stores data used at each stage of the scheduling and reads and writes the stored data in response to a request of each processing unit 10.

Figure 2:
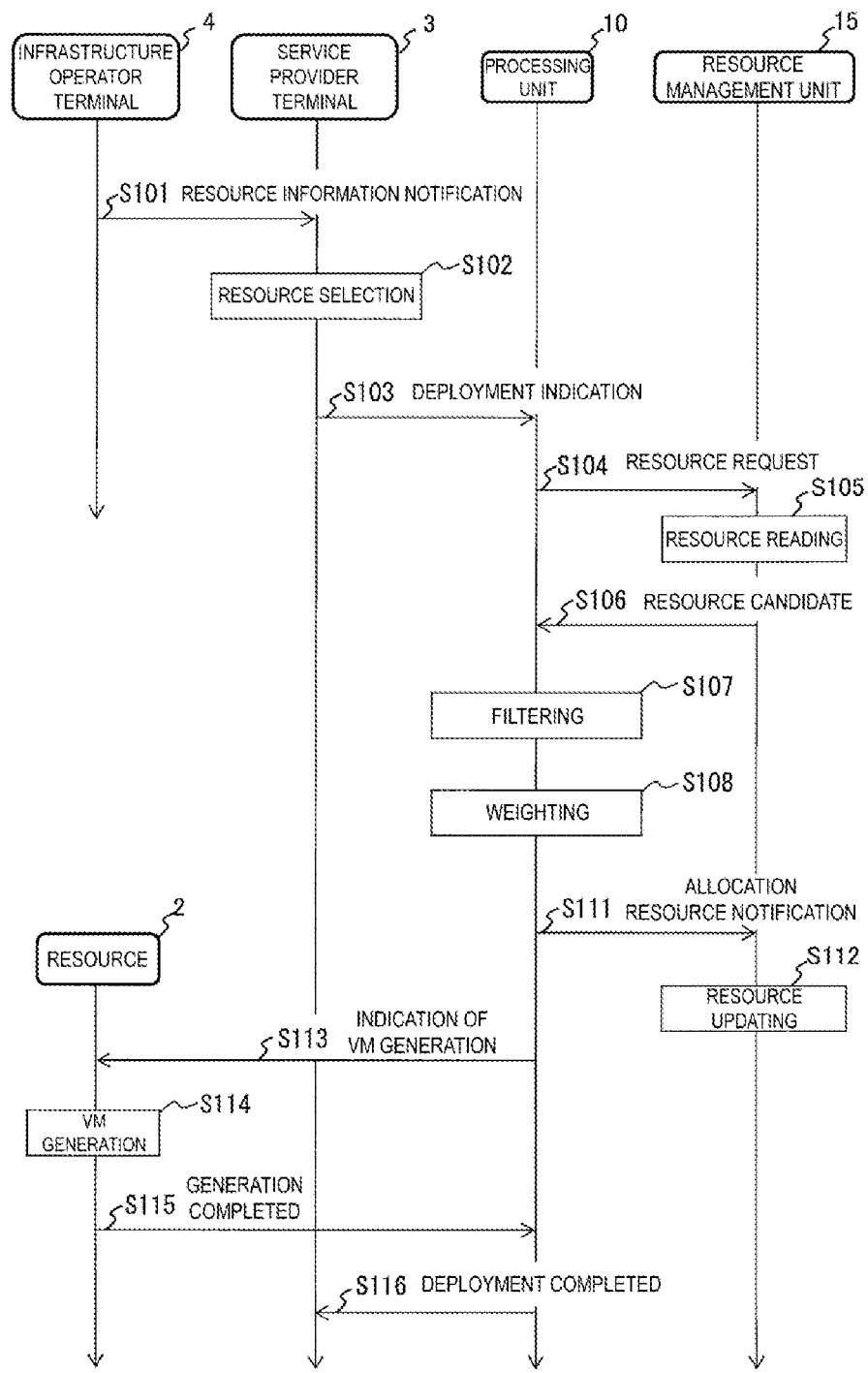
FIG. 2 is a sequence diagram illustrating resource allocation processing according to the present embodiment.

FIG. 2 is a sequence diagram illustrating resource allocation processing. The flow for the service provider to deploy a VM is introduced below.

In S101, the infrastructure operator terminal 4 provides information regarding the resources for allocation 2 acquired from the resource allocation apparatus 1 as the resource management information 31 to the service provider terminal 3 (FIG. 3).

In S102, the service provider terminal 3 selects, from the resources for allocation 2, resources required to build a service to be provided, based on the provided resource management information 31 and the information input in advance.

In S103, the service provider terminal 3 notifies the resource allocation determination unit 11 of the resource allocation apparatus 1 of the resource allocation definition file 32 describing the selection result of S102 to instruct resource allocation (deployment) (FIG. 4).

In S104, the resource allocation determination unit 11 requests resources that are currently allocatable from the resources for allocation 2 from the resource management unit 15.

In S105, the resource management unit 15 reads the resources that are currently allocatable from the stored data.

In S106, the resource management unit 15 returns the data read in S105 to the resource allocation determination unit 11 as resource candidates (FIG. 5).

In S107, the filtering unit 12 selects physical CPUs with characteristics that are the same as the characteristics of the virtual CPU specified in the resource allocation definition file 32 from the resource candidates of S106 notified of by the resource allocation determination unit 11 (FIG. 6).

In S108, the weighting unit 13 chooses a physical CPU among the physical CPUs selected in S107 which is suitable for the usage rate of the virtual CPU as the allocation destination (FIG. 6).

In S111, the weighting unit 13 notifies the resource management unit 15 of the physical CPU that is to serve as an allocation destination of S108 as allocation resources.

In S112, the resource management unit 15 updates the resources being managed to match the situation of the resources for allocation 2 after allocating the virtual CPU to the allocation resources notified of in S111 (FIG. 7).

In S113, the virtual machine generation unit 14 allocates the virtual CPU to the physical CPU serving as the allocation destination of S108, and instructs the resources for allocation 2 to generate a virtual machine (VM) that is to accommodate the virtual CPU.

In S114, the resources for allocation 2 receive the instruction of S113 and generate a virtual CPU and a VM that is to accommodate the virtual CPU.

In S115, the resources for allocation 2 notify the virtual machine generation unit 14 of the fact that the VM generation processing of S114 has been completed.

In S116, the resource allocation determination unit 11 notifies the service provider terminal 3 of the fact that the deployment request processing of S103 has been completed.

FIG. 3 is a table showing the resource management information 31. The resource management information 31 is composed of a benchmark list 31a that indicates performance of the resources for allocation 2 and a processing characteristic parameter list 31b that indicates processing characteristics of the resources for allocation 2.

The benchmark list 31a is data that indicates, for each type of processing, such as packet processing, how much resources are consumed when the type of processing is executed on the resources for allocation 2. In FIG. 3, CPU usage rates are shown as usage statuses on the benchmark list 31a. The CPU usage rates may be, for example, average values of CPU usage rates when measured in a defined environment or maximum values of CPU usage rates when the processing is activated.

In addition, although data of four types of processing is illustrated for one type of the resources for allocation 2 in FIG. 3, data of types of processing may be prepared for each resource for allocation 2 for a plurality of types of the resources for allocation 2.

The processing characteristic parameter list 31b is data in which processing characteristics and characteristic values of the resources for allocation 2 are associated. The processing characteristics may be, for example, the number of activations per unit of time illustrated in FIG. 3, or may be a running time during processing execution. The characteristic values are IDs, such as F1, F2, and F3, assigned to the ranges of processing characteristics.

FIG. 4 is a table showing the resource allocation definition file 32. The resource allocation definition file 32 is data in which, for each virtual CPU that is subject to a request for allocation, a type of processing to be operated on the virtual CPU, an amount of load such as a CPU usage rate required in the type of processing and processing characteristics such as an execution frequency in the type of processing are associated.

For example, it is assumed that the service provider terminal 3 has in advance received input of the following information regarding a service to be provided from the service provider.

Packet processing is performed 5 times.

Batch processing is performed 30 times.

The service provider terminal 3 refers to the benchmark list 31a to obtain a CPU usage rate of 50% corresponding to the packet processing and a CPU usage rate of 20% corresponding to the batch processing.

The service provider terminal 3 refers to the processing characteristic parameter list 31b to obtain a characteristic value F1 corresponding to the packet processing and a characteristic value F2 corresponding to the batch processing.

Then, the service provider terminal 3 creates the resource allocation definition file 32 for requesting a VM including a virtual CPU "V1" that causes the packet processing to operate and a virtual CPU "V2" that causes the batch process to operate based on the obtained information.

FIG. 5 shows a first table 15a stored in the resource management unit 15. The first table 15a includes currently allocatable resource candidates read by the resource management unit 15 in S105.

The first table 15a associates currently available remaining CPU usage rates (the remaining usability rate) with characteristic values of physical CPUs for each physical CPU of the resources for allocation 2.

For example, a physical CPU "C1" has already been allocated to another virtual CPU because the remaining usability rate is 20%. In other words, if a new virtual CPU is allocated to the physical CPU "C1", the shared allocation scheme is adopted.

On the other hand, a physical CPU "2" has a remaining usability rate of 100%, which means that no virtual CPU has been allocated at that point. In other words, if a new virtual CPU is allocated to the physical CPU "C2", the dedicated allocation scheme may be adopted.

FIG. 6 shows a second table 15b and a third table 15c stored in the resource management unit 15.

The second table 15b is a result as S107 of the filtering unit 12 in which the characteristic values of the physical CPUs of the first table 15a match characteristic values of virtual CPUs specified in the resource allocation definition file 32. The second table 15b has acceptance/rejection fields in which a combination of a virtual CPU and a physical CPU that is a candidate for an allocation destination having the same characteristic value is accepted as a "candidate", and a combination having different characteristic values is denoted by "rejected".

Furthermore, the filtering unit 12 may employ, as a "candidate", a physical CPU of the first table 15a with a remaining usability rate equal to or higher than the usage rate of the virtual CPU specified in the resource allocation definition file 32.

The third table 15c stores, in S108, the result of the weighting unit 13 assigning a rank (putting a weight=weighting) for selecting a physical CPU that is to serve as a candidate for the allocation destination for each virtual CPU among a combination designated as a "candidate" in the second table 15b. The lower the rank is, the more preferentially physical CPUs are chosen as an allocation destination.

The weighting unit 13 determines the rankings of the third table 15c for the candidates for the allocation destination corresponding to the same virtual CPU in descending order of the remaining usability rate of the first table 15a. For example, two physical CPUs of C2 and C4 are chosen as candidates for the allocation destination for the virtual CPU "V1". Among these, because the remaining usability rate "50%" of the physical CPU "C4" is lower than the remaining usability rate "100%" of the physical CPU "C2", the physical CPU "C4" is ranked first.

FIG. 7 shows a fourth table 15d stored in the resource management unit 15.

The fourth table 15d illustrates the result of update processing (S112) of the first table 15a after the candidates for the allocation destination first in the ranking of the third table 15c are determined as allocation destinations.

The remaining usability rate of the physical CPU "C1" has decreased from "20%" to "0%". The reason for this is that, as a result of the virtual machine generation unit 14 allocating a virtual CPU "V2" to the physical CPU "C1", the usage rate "20%" of the batch processing assigned to the virtual CPU "V2" of the resource allocation definition file 32 is consumed.

The remaining usability rate of the physical CPU "C4" has decreased from "50%" to "0%". The reason for this is that, as a result of the virtual machine generation unit 14 allocating the virtual CPU "V1" to the physical CPU "C4", the usage rate "50%" of the packet processing assigned to the virtual CPU "V1" of the resource allocation definition file 32 is consumed.

In the present embodiment described above, for the server infrastructure technology for building and operating a computer system, if information on characteristics of virtual CPUs ascertained by the service provider and information on characteristics of physical CPUs ascertained by the infrastructure operator are exchanged in advance, the resource allocation apparatus 1 can appropriately determine resources to be allocated.

As described below, the allocation results of the resource allocation apparatus 1 can satisfy the demand of the service provider and the demand of the infrastructure operator in a well-balanced manner.

The filtering unit 12 can filter out resources that are not appropriate for the resource allocation definition file 32 in advance, which enables the service provider to provide service contents smoothly (without stopping or insufficient performance).

The weighting unit 13 determines selection order of the resources in an order of high resource use efficiency from the remaining usability rates of the resource management unit 15. For example, if resources having lower remaining usability rates are preferentially selected (the shared allocation scheme), the total number of physical CPUs provided can be saved. Thus, VMs can be efficiently accommodated in the resources for allocation 2 without requiring the infrastructure operator to take parameter values such as the overcommit ratio of each physical CPU into account.

On the other hand, in the related art, while an infrastructure operator could select the dedicated allocation scheme or the shared allocation scheme for each physical CPU or set an overcommit ratio in the shared allocation scheme as an operation parameter of OpenStack, trial and error based on experiences and a sense of the infrastructure operator were required to input of an operation command, such as which operation parameter is set for which VM.

Note that, although the number of the resources for allocation 2 in the present embodiment according to the present invention is set to three as illustrated in FIG. 1, the invention is not limited to that number or configuration. In addition, in the present invention, hardware resources of a general computer can be realized by a program that causes the resource allocation apparatus 1, the service provider terminal 3, and the infrastructure operator terminal 4 to operate as each means. In addition, the program may also be distributed over a communications line, or may be recorded and distributed on a recording medium such as a CD-ROM.

REFERENCE SIGNS LIST

1 Resource allocation apparatus
2 Resources for allocation
3 Service provider terminal (terminal of service provider)
4 Infrastructure operator terminal (terminal of infrastructure operator)
10 Processing unit
11 Resource allocation determination unit
12 Filtering unit
13 Weighting unit
14 Virtual machine generation unit (resource allocation unit)
15 Resource management unit
31 Resource management information
31a Benchmark list
31b Processing characteristic parameter list
32 Resource allocation definition file

The invention claimed is:

1. A resource allocation apparatus comprising:
a filtering unit, including one or more processors, configured to receive an allocation request specifying an amount of use of a physical resource to be used by a virtual resource and a characteristic value characterizing a number of activations per unit of time of the physical resource for the virtual resource and select a resource for allocation that matches the characteristic value characterizing the number of activations per unit of time of the physical resource specified in the allocation request;
a weighting unit, including one or more processors, configured to choose the physical resource that is to serve as an allocation destination of the virtual resource based on an amount of use in which each of the selected resources for allocation is available and the amount of use of the physical resource specified in the allocation request; and
a resource allocation unit, including one or more processors, configured to allocate the virtual resource specified in the allocation request to the physical resource chosen as the allocation destination.

2. The resource allocation apparatus according to claim 1, wherein the weighting unit is configured to choose as an allocation destination for the virtual resource as the amount of use in which each of the selected resources for allocation is available becomes smaller.

3. A resource management system including the resource allocation apparatus according to claim 1, a terminal of an infrastructure operator configured to operate the resources for allocation, and a terminal of a service provider configured to receive the resources for allocation and provides a service,
wherein the terminal of the infrastructure operator comprises one or more processors and is configured to notify the terminal of the service provider of performance data and characteristic data of each of the resources for allocation, and
the terminal of the service provider comprises one or more processors and is configured to identify the amount of use of the physical resource to be used by the virtual resource from the notified performance data for each of the resources for allocation, identifies a characteristic value characterizing a number of activations per unit of time of the physical resource to be used by the virtual resource from the notified characteristic data for each of the resources for allocation, and thus creates the allocation request.

4. The resource management system according to claim 3, wherein the terminal of the infrastructure operator is configured to give a notification of a CPU usage rate when the resource for allocation is a physical CPU for each type of processing to be operated on the physical CPU as performance data for each of resources for allocation, and
the terminal of the service provider is configured to obtain a CPU usage rate used by the virtual resource as an amount of use of the physical resource based on the notified CPU usage rate for each type of processing from types of processing of a service input in advance.

5. The resource allocation apparatus according to claim 1, wherein:
the physical resource is a physical CPU;
the filtering unit is configured to identify, from a plurality of physical CPUs, a list of candidate physical CPUs as candidate allocation destinations for the virtual resource based on the respective numbers of activations per unit of time of the plurality of physical CPUs; and
the weighting unit is configured to rank the list of candidate physical CPUs according to respective remaining usability rates of the candidate physical CPUs, and select, from the list of candidate physical CPUs, an allocation CPU that has the lowest remaining usability rate as the allocation destination for the virtual resource.

6. A non-transitory computer readable medium storing a resource allocation program for enabling a computer serving as a resource allocation apparatus to realize a filtering unit, a weighting unit, and a resource allocation unit,
wherein the filtering unit is configured to receive an allocation request specifying an amount of use of a physical resource to be used by a virtual resource and a characteristic value characterizing a number of activations per unit of time of the physical resource for each of the virtual resources and select a resource for allocation that matches the characteristic value characterizing the number of activations per unit of time of the physical resource specified in the allocation request, and
the weighting unit is configured to choose the physical resource that is to serve as an allocation destination of the virtual resource based on an amount of use in which each of the selected resources for allocation is available and the amount of use of the physical resource specified in the allocation request; and
the resource allocation unit is configured to allocate the virtual resource specified in the allocation request to the physical resource chosen as the allocation destination.

7. The non-transitory computer readable medium according to claim 6,
wherein the weighting unit is further configured to choose as an allocation destination for the virtual resource as the amount of use in which each of the selected resources for allocation is available becomes smaller.

* * * * *